United States Patent
Monteyne et al.

(10) Patent No.: US 10,034,431 B2
(45) Date of Patent: Jul. 31, 2018

(54) METHOD FOR UNLOADING BALES FROM A ROUND BALER ONTO A FIELD

(71) Applicant: CNH Industrial America LLC, New Holland, PA (US)

(72) Inventors: Niklaas Monteyne, Blankenberge (BE); Eddy Roland Lammerant, Oostduinkerke (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/701,037

(22) Filed: Sep. 11, 2017

(65) Prior Publication Data

US 2018/0077870 A1    Mar. 22, 2018

(30) Foreign Application Priority Data

Sep. 21, 2016 (BE) .................................. 2016/5709

(51) Int. Cl.
| | | |
|---|---|---|
| *A01F 15/07* | (2006.01) | |
| *A01F 15/08* | (2006.01) | |
| *A01D 90/10* | (2006.01) | |
| *A01D 90/00* | (2006.01) | |

(52) U.S. Cl.
CPC .......... *A01F 15/0705* (2013.01); *A01D 90/00* (2013.01); *A01D 90/10* (2013.01); *A01F 15/0715* (2013.01); *A01F 15/0765* (2013.01); *A01F 15/0883* (2013.01)

(58) Field of Classification Search
CPC .............. A01F 15/0715; A01F 15/0705; A01F 15/0765; A01F 15/0875; A01F 15/0883; A01D 85/00; A01D 85/005; A01D 90/00; A01D 90/10

USPC ......................... 100/7, 8, 35, 87, 88; 56/341
See application file for complete search history.

(56) References Cited

U.S. PATENT DOCUMENTS

| | | | | |
|---|---|---|---|---|
| 4,115,984 A | * | 9/1978 | Simpson | A01D 78/001 172/313 |
| 7,401,547 B2 | * | 7/2008 | Degen | A01F 15/08 100/35 |
| 9,635,814 B2 | * | 5/2017 | Kraus | A01F 15/0883 |

(Continued)

FOREIGN PATENT DOCUMENTS

| | | |
|---|---|---|
| DE | 3304166 A1 | 8/1984 |
| EP | 1138189 A2 | 10/2001 |
| EP | 1832157 A1 | 9/2007 |

(Continued)

*Primary Examiner* — Jimmy T Nguyen
(74) *Attorney, Agent, or Firm* — Peter K. Zacharias (57) ABSTRACT

A method for unloading a first and a second bale from a round baler onto a field. The round baler includes a bale chamber and a bale holder. The method successively includes steps of: growing the second bale in the bale chamber, while the first bale is carried by the bale holder; unloading the first bale from the bale holder onto the field a period of time before finishing growing the second bale, the first bale defining a first position on the field; finishing growing the second bale; transporting the second bale to the bale holder; and unloading the second bale onto the field. The second bale defines a second position on the field. The period of time is determined such that a distance between the first position and the second position is smaller than a sum of the diameters of the first bale and second bale.

15 Claims, 2 Drawing Sheets

(56) References Cited

U.S. PATENT DOCUMENTS

2015/0216125 A1* 8/2015 Olander ................. A01F 15/07
                                                                                 701/50
2016/0014966 A1    1/2016 Kraus et al.

FOREIGN PATENT DOCUMENTS

EP         3162189 A2 *  5/2017  ............ A01F 15/07
WO     2014031355 A1   2/2014

* cited by examiner

METHOD FOR UNLOADING BALES FROM A ROUND BALER ONTO A FIELD

CROSS REFERENCE TO RELATED APPLICATION

This application claims priority to Belgium Application No. 2016/5709 filed Sep. 21, 2016, the contents of which are incorporated herein by reference.

BACKGROUND OF THE INVENTION

The present invention relates to a method for unloading bales from a round baler onto a field. Particularly, the present invention relates to an improved method for unloading a first bale and a second bale from a round baler via a bale holder onto a field.

Prior art methods for unloading bales from a round baler onto the field typically include growing a bale in the bale chamber of the round baler, optionally transporting a grown bale from the bale chamber to a bale wrapper of the round baler, optionally wrapping the bale on the bale wrapper, and unloading the (wrapped) bale onto the field. This method is repeated for any other bale that is to be grown, wrapped and unloaded. The position where a bale is unloaded from the round baler depends on various factors such as: how much crop is taken in, at which rate, is this rate constant, how long does it take for a bale to be grown in the bale chamber, how long does it take for a bale to be wrapped on the bale wrapper, how fast is the round baler moving, etc. This dependency on so many different variables typically leads to bales being unloaded from the round baler onto the field at seemingly random positions. In other words, prior art methods for unloading bales from round balers typically result in unloaded bales being spread out all over the field. Particularly picking up or collecting the spread out bales from the field can be time-consuming and inefficient.

It is an object of the present invention to provide an improved method for unloading bales from a round baler onto a field in an efficient manner which reduces the collecting effort.

SUMMARY OF THE INVENTION

To this end, the invention provides a method for unloading a first bale and a second bale from a round baler onto a field, the round baler comprising a bale chamber and a bale holder, the bale holder being located outside of the bale chamber, wherein the method successively comprises the steps of:

growing the second bale in the bale chamber, while the first bale is carried by the bale holder;

unloading the first bale from the bale holder onto the field a period of time before finishing growing the second bale, the first bale defining a first position on the field when the first bale is at rest on the field;

finishing growing the second bale, transporting the second bale from the bale chamber to the bale holder, and unloading the second bale from the bale holder onto the field, the second bale defining a second position on the field when the second bale is at rest on the field;

wherein the period of time is determined such that a distance between the first position and the second position is smaller than a sum of a diameter of the first bale and a diameter of the second bale.

The method of the present invention provides in a series of subsequent steps that allow for the first bale and second bale to be unloaded onto the field such that the first bale and second bale are close to each other, preferably against each other, when they are at rest on the field. This way, the first and second bale can be advantageously collected from the field. For example, a loader or fork lift may be able to collect both the first and second bale at one and the same time. Moreover, less and/or shorter displacements on the field are required to collect the first and second bale for transport, as compared to prior art unloading methods.

According to the method of the invention the first bale is carried by the bale holder while the second bale is being grown in the bale chamber. This step is in contrast with prior art methods where a bale is typically directly unloaded onto the field when the bale is finished growing and/or wrapping. By allowing the first bale to be carried on the bale holder, while the second bale is growing in the bale chamber, it is made possible to unload the first bale onto the field only a period of time before growing the second bale is finished. In this manner, the bale holder functions as a buffer for the first bale. The period of time is carefully determined such that, when the second bale is eventually unloaded onto the field after growing in the bale chamber and being transported to the bale holder, the second bale is unloaded onto the field nearby the first bale. More in particular, the period of time is determined such that the distance between the first position, defined by the first bale when the first bale is at rest on the field, and the second position, defined by the second bale when the second bale is at rest on the field, is smaller than the sum of the diameter of the first bale and the diameter of the second bale.

The method of the invention allows for an efficiency of the round baler to be improved, since a first and second bale are unloaded in proximity of each other without wasting time in the process of unloading the first and second bale. In other words, the first bale is unloaded from the bale holder onto the field as soon as the second bale has almost finished growing in the bale chamber. Thus no time is wasted during the method of the invention. Moreover, the method of the invention allows the round baler to be comfortably operated by a human operator wherein, because of the efficient succession of the proposed steps, the operator is relieved from some intensive and concentration requiring operations which are required in prior art methods such as frequently stopping the round baler from advancing and restarting the round baler to advance. In prior art methods there is a risk of damaging the baler chamber or elements thereof when the round baler is not stopped in time. This risk is reduced by the method of the invention.

Preferably, the method comprises, before the step of growing the second bale in the bale chamber, the steps of:

growing the first bale in the bale chamber, finishing growing the first bale and transporting the first bale from the bale chamber to the bale holder.

By first growing the first bale in the bale chamber, finishing growing the first bale and transporting the first bale to the bale holder, the first bale is available on the bale holder to be unloaded the period of time before growing the second bale is finished.

Preferably, the method comprises for each of the first bale and second bale, before the step of transporting the respective bale from the bale chamber to the bale holder, the step of:

wrapping the respective bale in the bale chamber with a wrapping element.

By wrapping the respective bale in the bale chamber with a wrapping element such as for example a rope or net, the firmness and cohesion of the respective bale can be increased before transporting the respective bale to the bale holder and unloading the respective bale.

Preferably, the steps of growing the first bale in the bale chamber and growing the second bale in the bale chamber each comprise introducing crop into the bale chamber while advancing the round baler over the field at a first speed; and the steps of finishing growing the first bale in the bale chamber and finishing growing the second bale in the bale chamber each comprise stopping the round baler from advancing over the field.

By advancing the round baler over the field at a first speed, crop can be introduced into the bale chamber and from the introduced crop the respective bale can be grown. Stopping the baler from advancing over the field presents the opportunity to finish growing the respective bale in the bale chamber, since no more crop is introduced in the bale chamber when the round baler is at a halt, and to transport the respective bale from the bale chamber to the bale holder after finishing forming the respective bale.

Preferably the method comprises the step of advancing the round baler over the field at a second speed at least said period of time before finishing growing the second bale, the second speed being lower than the first speed, such that the first bale is unloaded from the bale holder onto the field while the round baler advances over the field at the second speed to complete the second bale.

By unloading the first bale onto the field while the round baler advances over the field at the second speed which is slower than the first speed, chances are less likely that the unloaded bale might break on impact with the field or starts rolling on the field. Moreover, unloading the first bale onto the field while the round baler advances over the field at the second speed which is slower than the first speed allows for an accurate unloading of the first bale onto the field, said period of time before finishing growing the second bale, stopping the round baler from advancing and unloading the second bale onto the field.

Preferably, the bale chamber comprises a bale chamber door towards the bale holder, wherein the method comprises the steps of:

opening the bale chamber door after the round baler has stopped from advancing over the field, for transporting the first bale and the second bale, respectively, from the bale chamber to the bale holder; and closing the bale chamber door, before advancing the round baler over the field.

By opening the bale chamber door after the round baler has stopped from advancing it is avoided that crop is unintendedly introduced in the bale chamber. By closing the bale chamber door before advancing the round baler over the field, it is avoided that crop, which is introduced in the bale chamber while advancing the round baler over the field, passes through the bale chamber via the opened bale chamber door.

Preferably, the method comprises, while growing the second bale in the bale chamber, at least one of the steps of:

obtaining bale chamber sensor data, representative for a status of the second bale being grown in the bale chamber; and obtaining baler movement data, representative for a movement status of the round baler;

wherein said period of time is determined based on the obtained data.

Preferably the method further comprises obtaining field data concerning crop volume and as such determine/estimate/calculate when second bale will be completed. Based on crop data on the field (measured with all kind of sensors (TBC)), the system knows when the baler need to stop for full second bale (time & distance) and as such know when the baler needs to go to the second speed (reduced) in which it drops the first bale. The calculated distance for completing the second bale is smaller than or equal to the diameter of the bale.

Bale chamber sensor data and/or baler movement data and field crop data that can be collected by all kind of sensors are useful to help determine the period of time before finishing forming the second bale. Based on the obtained data it can be determined how long it will take until finishing forming the second bale, such that the first bale can be unloaded at the right moment in order for the distance between the first position and the second position to be smaller than the sum of the diameter of the first bale and the diameter of the second bale.

Preferably, the successive steps of the method are performed iteratively, such that bales are unloaded onto the field forming pairs on the field of a first bale and a second bale.

This way, the pairs of first and second bales can be advantageously collected from the field. For example, a loader or fork lift may be able to collect a pair of a first and second bale at one and the same time by pressing a tooth of the forklift in each bale. Since the bales are placed together, the bales will support each other during displacement on the field so that the bales will not drop. Moreover, less and/or shorter displacements on the field are required to collect the pairs of first and second bales for transport, as compared to prior art unloading methods wherein the unloaded individual bales are spaced apart all over the field.

The skilled person will understand that the hereinabove described technical considerations and advantages for method embodiments also apply to the below described corresponding baler embodiments, mutatis mutandis.

The invention further relates to a round baler comprising a bale chamber, a bale holder, the bale holder being located outside of the bale chamber, wherein the round baler comprises a controller, the controller being configured to control the round baler to perform the method according to an embodiment of the invention.

Preferably, the round baler comprises a wrapper in the bale chamber, and the controller is configured to control the round baler to perform the method according to an embodiment of the invention.

Preferably, the round baler is provided with an operational connection to a towing vehicle, and the controller is configured to send control signals via the operational connection to the towing vehicle for performing the method according to an embodiment of the invention.

Preferably, the baler chamber comprises a bale chamber door towards the bale holder, and the controller is configured to control the round baler to perform the method according to an embodiment of the invention.

Preferably, the round baler comprises at least one of a bale chamber sensor configured for obtaining bale chamber sensor data and a movement sensor for obtaining baler movement data, and the controller is configured to control the round baler to perform the method according to an embodiment of the invention.

Preferably, the bale chamber sensor data comprises at least one of a density, view, diameter and weight of the second bale being formed in the bale chamber and the baler movement data comprises at least one of a speed and acceleration of the round baler with regard to the field.

Preferably, the baler has a sensing device in front of the baler to determine the volume/weight of the crop on the field and/or has a detection method on the baler (e.g. how fast is the bale size growing) able to predict when the second bale reach its full diameter.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
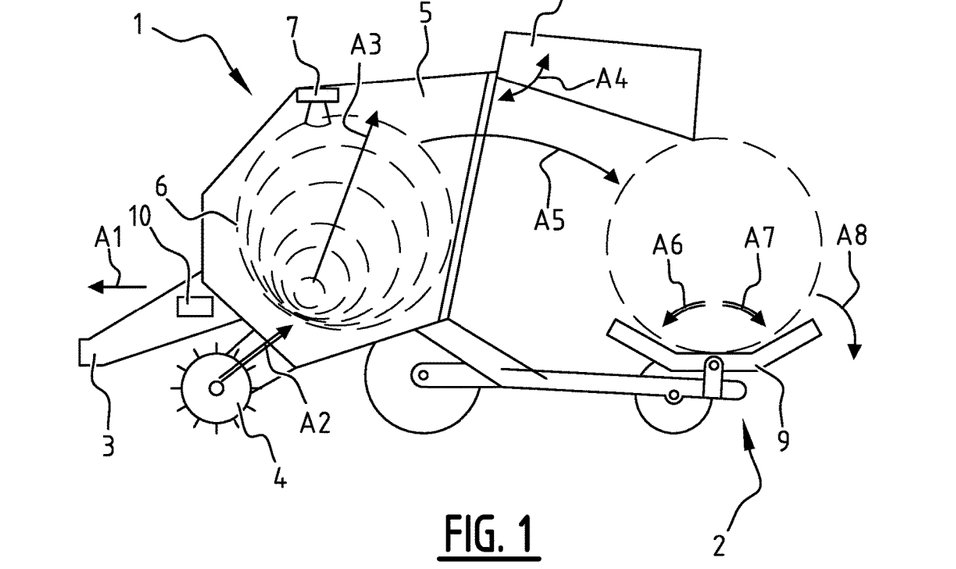
FIG. 1 schematically shows a round baler and bale holder according to an embodiment of the invention.

FIG. 1 illustrates a round baler 1, hereafter also called baler. This round baler 1 is preferably an agricultural baler adapted to produce round bales. Thereby, it will generally be recognized by the skilled person that a so-called round bale, when it is completed, has a generally cylindrical shape with a length and a diameter. The length of the cylindrical shape corresponds to the width of the agricultural baler 1, and the diameter can somewhat vary depending on multiple factors. The maximum diameter of the bale corresponds to the maximum dimensions of the bale chamber of the baler 1. When the chamber is variable, the selected bale size can be smaller than the bale chamber diameter.

Forming bales in a round baler is a discontinuous process, wherein the baler 1 is started to advance over the field when formation of a bale in the bale chamber is started, and wherein the advancing of the baler over the field is stopped when the bale in the bale chamber reaches full growth. The mechanisms and elements relating to and used for forming the bales in the bale chamber, which are briefly described hereunder for completeness, are known in the art of forming round balers, and are therefore not described with many details. Based on the description hereunder, the skilled person will understand, using his knowledge in the art of round balers, how such round baler with the described functionality can be constructed. In this context, the figures nor the description are meant to be limiting and are only intended as an illustration of an example of the invention.

The round baler 1 is connected to a bale holder 2. Bale holders are typically used in the art as wrapping devices, wherein the holder is adapted to hold a bale after it has been transported out of the bale chamber 5 of the baler 1, and wherein the bale carried by the bale holder can be wrapped for example with a plastic foil. The present invention particularly relates to the use of a combination of a baler 1 and a bale holder 2. In the invention, the bale holder 2 is used as a buffer. Thereby preferably, in the present invention, the wrapping function of the bale holder 2 is omitted or is at least not considered an essential part of the invention. In the present invention, the bale holder 2 mainly functions as a holder or a buffer for finished bales. Further details of the bale holder 2, and of the use of the combination of the baler 1 and the bale holder 2 will be described hereunder.

The round baler 1 comprises a towing connector 3. The towing connector 3 is provided at a front end of the baler 1. Balers are typically not self-powered, but are towed and driven by an agricultural vehicle such as a tractor. The tractor connects to the towing connector 3 so that the tractor can lead the agricultural baler 1 over the field. The tractor is preferably further operationally connected to the round baler 1, for example via a PTO, hydraulic and/or electric connection, to drive the mechanical and electrical components of the round baler 1. Further preferably, an operational communication connection is provided between the round baler and the agricultural towing vehicle so that starting and stopping instructions, and preferably also speed related instructions, can be provided by the round baler to the towing vehicle to maximally automate and/or optimize the bale forming process. When the round baler 1 is connected to an agricultural towing vehicle, and is advanced over a field, the arrow A1 illustrates the forward advancing direction of the baler 1.

The round baler 1 comprises a pickup mechanism 4 which is schematically illustrated in FIG. 1, which pickup mechanism 4 is adapted to pickup crop material, for example a swath from a field, and to introduce this material into the bale chamber 5. The introducing of crop material into the bale chamber 5 by the pickup mechanism 4 is in FIG. 1 schematically illustrated with arrow A2. In this context, it will be clear that crop can only be introduced A2 into the bale chamber 5 while the round baler 1 is advanced over a field. Since typically no or no significant crop material buffer is provided at the pickup mechanism 4, the round baler 1 is stopped advancing over the field when stopping introducing A2 crop material in the bale chamber 5. In other words, there is a proportional relation between introducing material into the bale chamber 5, indicated with arrow A2, and advancing the baler 1 over the field, indicated with arrow A1.

In the bale chamber 5 of the round baler 1, a bale 6 is grown. Growing a bale in a bale chamber 5 is known in the art, and is illustrated in FIG. 1 with arrow A3. Thereby, it will be clear that the proportional relation between introducing crop A2 and advancing over the field A1 also relates to the growing A3 of the bale 6.

In the bale chamber 5 multiple sensors 7 can be provided to monitor and control the bale formation. In FIG. 1 the sensor 7 is schematically shown on one location, however it will be clear that the sensor 7 can be embodied by a various amount of sensors for measuring multiple aspects of the bale. The sensors can be placed at different locations in and/or at the baler 1. Examples of aspects that can be measured are density, diameter, weight, uniformity, . . . . Sensors that can be used are density sensors, speed sensors, diameter sensors, cameras, weight sensors, . . . . Other sensor data might also be used to control the operation of the round baler, for example the advancing speed and the swath shape and/or density.

At the back end of the bale chamber 5, a bale chamber door 8 is provided. The bale chamber door 8 is rotatable between an open position, as shown in FIG. 1, and a closed position (not shown). Opening and closing of the bale chamber door 8 is in FIG. 1 illustrated with arrow A4. It will be clear for the skilled person that in the closed position of the bale chamber 8, a bale can be formed inside the bale chamber 5. Typically, it is required that the bale chamber door 8 is closed for forming a bale 6 in the bale chamber 5. A consequence thereof is that the baler 1 can only be advanced A1 over the field when the bale chamber door 8 is closed. Before opening the bale chamber door, the advancing A1 of the baler 1 has to be stopped.

In the open position of the bale chamber door 8, a finished bale 6 can be transported out of the bale chamber 5 onto the bale holder 2. This is illustrated in FIG. 1 with arrow A5. Since the bale chamber door is in the open position while transporting A5 the finished bale from the bale chamber to the bale holder, this transporting step A5 can only be executed in a stopped state of the round baler. A stopped state of the round baler is defined as a state wherein the advancing A1 of the round baler over the field has stopped such that the round baler has a fixed position with respect to the field.

The bale holder 2 comprises a support 9 for carrying a bale 6. The support 9 is preferably pivotable. Pivotable bale supports 9 are known from bale wrappers, and are therefore not described in more technical details. The pivotable support is adapted to pivot towards a front end of the bale holder 2, illustrated in FIG. 1 with arrow A6, to pickup a bale when it is transported A5 out of the bale chamber 5. The pivotable support 9 is further adapted to pivot towards a back end of the bale holder 2, illustrated in FIG. 1 with arrow A7, to drop the bale onto the field at a back end of the bale holder 2. Dropping a bale onto the field is illustrated in FIG. 1 with arrow A8.

Figure 2:
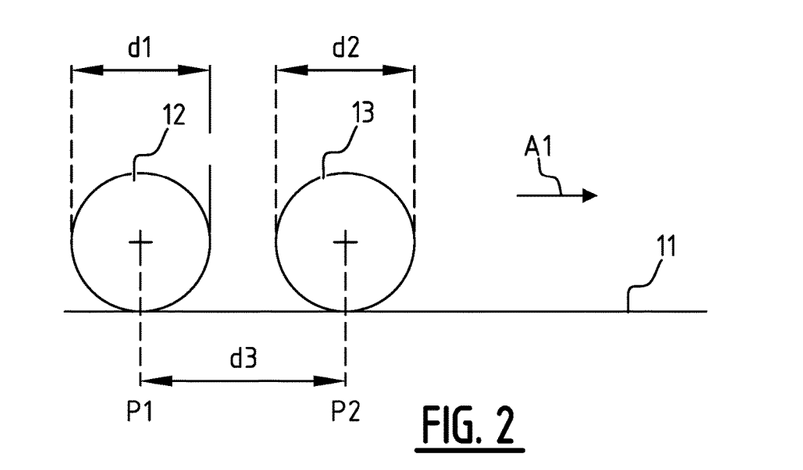
FIG. 2 illustrates how a first bale and a second bale are unloaded onto a field according to an embodiment of the invention.

FIG. 2 illustrates a field 11, and a first bale 12 and a second bale 13 that are dropped onto the field 11. Thereby, FIG. 2 illustrates the advantages situation wherein the first bale 12 and the second bale 13 are located on the field close to each other, when the first and second bales are at rest on the field. Thereby close to each other is defined as the distance d3 between a first position P1 of the first bale 12 on the field 11 and a second position P2 of the second bale 13 on the field 11 is smaller than the sum of a diameter d1 of the first bale 12 and a diameter d2 of the second bale 13. The position of a bale onto the field is defined as the spot on the field 11 that is directly underneath the center of gravity of the bale. Preferably, the distance d3 is substantially equal to the sum of the radiuses of the bales. In such case, the bales are against each other and touch each other on the field.

The advantage of positioning two bales 12, 13 close to each other on the field 11 is that it reduces the amount of work and the driving distance required for picking up the bales 12 and 13 from the field 11. When the bales are located close to each other, a bale pickup vehicle can be driven to the bales 12, 13, and pickup the two bales 12, 13 without having to drive between picking up the first 12 and the second 13 bale. In a further advantages embodiment, the two bales 12, 13 can be picked up together in one fluent movement, when the bales 12, 13 are located close to each other, via a fork lift. A fork lift typically has two teeth extending substantially parallel at a distance from each other. The fork lift can be positioned with respect to the first and second bale 12 and 13 such that one of the teeth is pushed into the first bale 12 while the other of the teeth is substantially simultaneously pushed into the second bale 13. In this manner, the two bales 12 and 13 can be lifted together, in a single movement, thereby significantly simplifying the collecting and picking up of the bales 12, 13. For completeness, it is noted that the bales might not be perfectly round so that the diameter d1, d2 is different depending on the measurement orientation. In such cases, the diameter of the bale is defined as the average diameter over the length of the cylindrically shaped bale and over the multiple measurement orientations within the cylinder.

In FIG. 2, the advancing direction A1 of the baler is also illustrated with arrow A1. This advancing direction determines the orientation of the first bale and the second bale 12, 13 with respect to each other on the field 11. As will be described hereunder, firstly, the first bale 12 is dropped on the field, during bale forming of the second bale (no standstill for dropping of the first bale, only standstill for dropping of the second bale), and secondly, after the baler has advanced over a distance related to distance d3 in the direction A1, the second bale 13 is dropped. Therefore, in the advancing direction A1, the first bale 12 is located on the field 11 behind the second bale 13.

Figure 3:
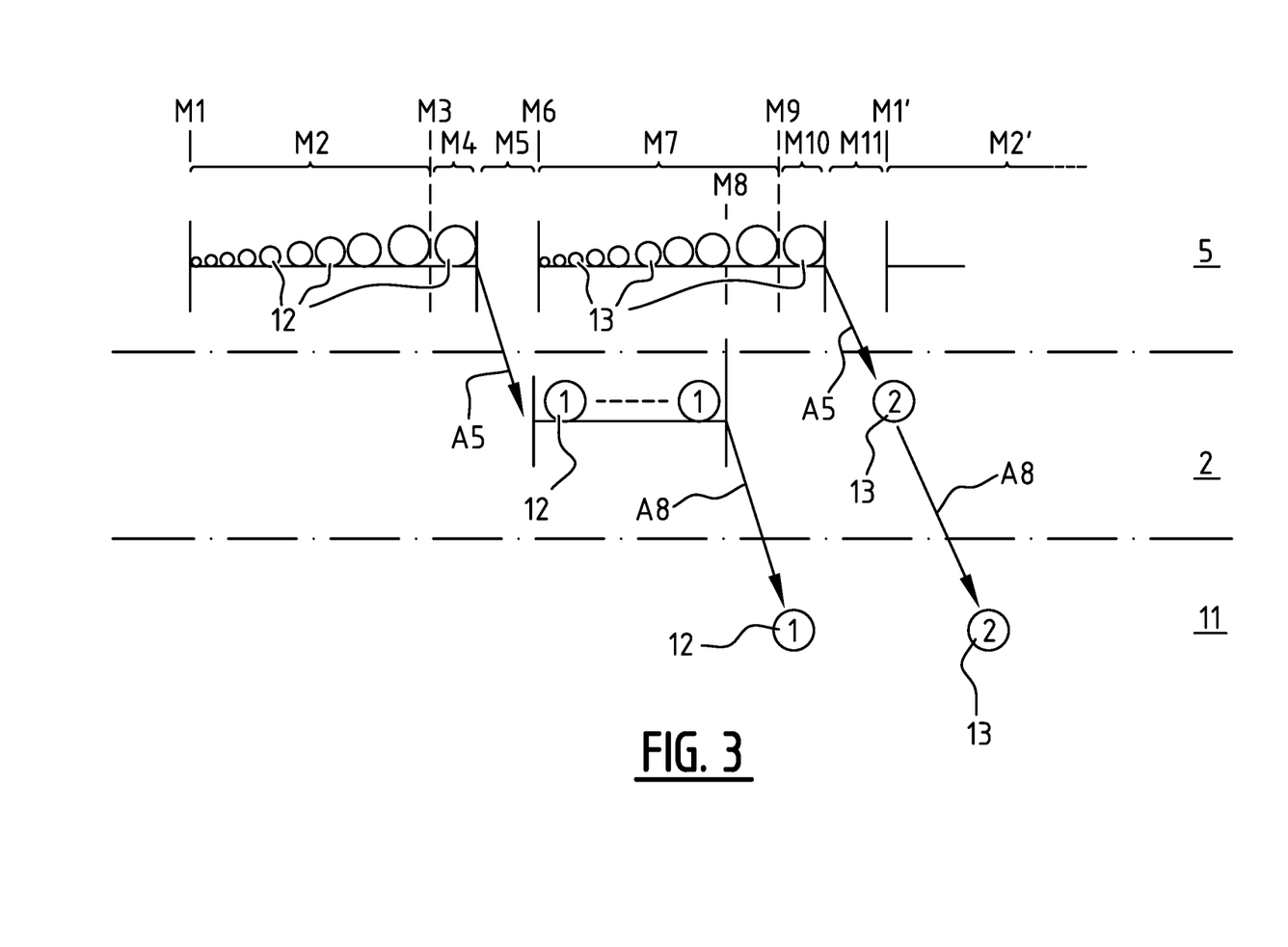
FIG. 3 shows a timeline illustrating the steps of the method according to an embodiment of the invention.

FIG. 3 illustrated a sequence of steps for optimally dropping bales onto a field as illustrated in FIG. 2 using the baler 1 and bale holder 2 as illustrated in FIG. 1. FIG. 3 shows an upper part, a middle part and a lower part, separated by a dotted line. This separation corresponds to the physical location where the method steps take place. The upper part comprises the steps that take place in the bale chamber 5. The intermediate part illustrates the steps that take place on the bale holder 2 while the lower part illustrates the steps that take place at the field 11. Thereby the steps taking place at the bale chamber 5, the bale holder 2 and field 11 are defined as steps for which the major action and/or major effect is obtained at that respective location. Interaction between the bale chamber 5, bale holder 2 and field 11 are illustrated by arrows A5 and A8 crossing the sections. The figure is further drawn as a timeline wherein time advance in the horizontal direction, as will be clear from the further description. Therefore the distance in FIG. 3 between the first bale 12 and second bale 13 on the field 11 relates to a distance in time, and not to a distance in location.

In FIG. 3, step M1 illustrates starting growing of the first bale 12. This step M1 is related to closing of the bale chamber door 8 since growing of a bale can only be started after the bale chamber has closed. This step M1 is further related to starting advancing A1 the baler over the field 11. By advancing the baler 1 over the field, crop material can be picked up by the pickup means 4 and introduced A2 into the bale chamber 5.

Step M2 illustrates growing the first bale 12 in the bale chamber 5. During this growing step M2, the baler advances A1 over the field 11 at a speed. Preferably, the advancing speed varies over the period of time during which the step M2 is executed. Thereby, a first speed is definable at which first speed the baler is advanced over the field during a first section of the step M2. A second speed can be defined over which the baler 1 is advance over the field during a subsequent part of the step M2. The second speed is slower than the first speed so that also the crop introduction flow A2 decreases towards an end of step M2. This improves the operation of the baler when ending the bale growing step M2. In this regard, it is noted that the first speed and the second speed need not be constant, but can comprise speed variations. When the first speed and second speed comprise variations, it can be determined that the first speed is higher than the second speed when the average speed of the first speed variation is higher than an average speed of the second speed variation.

At step M3, growing of the bale 12 has finished and the growing process M2 is stopped. When the process of growing is stopped, at step M3, the advancing of the baler over the field is also stopped.

FIG. 3 shows subsequently a further step M4 illustrating wrapping of the bale in the bale chamber 5. Preferably, in this step M4, the bale is wrapped with a net or plastic or twine so that the crop material in the bale is held together and is able to at least largely maintain its shape during further steps. At the end of the step M4, the first bale 12 in the bale chamber 5 is ready to be unloaded from the bale chamber 5.

In step M5, the finished first bale 12 is transported out of the bale chamber 5 onto the bale holder 2. This is illustrated in FIG. 3 with the arrow A5 that corresponds to the arrow A5 in FIG. 1. Therefore at the beginning of the step M5, the bale chamber door is opened. This is possible since the baler has stopped advancing over the field at step M3, and thus stands still. At the end of step M5, when the bale has arrived at the bale holder 2, the bale chamber door 8 is closed so that a next bale can be formed.

The next step in the sequence, step M6, corresponds to the step M1. The difference between the step M6 and step M1 is that step M6 starts forming the second bale while the first bale is located on the bale holder 2. At step M1, the bale holder 2 is empty. At step M6, the first bale lays on the bale holder 2. Furthermore, at step M6, the bale chamber door 8 is closed and the baler starts to advance over the field for forming the second bale 13.

During step M7, the second bale is formed. Step M7 largely corresponds to step M2. The difference between step M7 and step M2 is that the bale holder 2 carries the first bale 12 at least over a majority of the step M7.

A period of time before finishing the second bale 13, being a period of time before the end of step M7, step M8 is executed. In step M8, the first bale 12 is dropped onto the field 11, as is illustrated with arrow A8. This arrow A8 corresponds to arrow A8 from FIG. 1. The first speed and second speed described above in relation to step M2 are preferably chosen such that step M8 is executed when the baler is advanced at the second speed. The effect is that the first bale 12 is dropped A8 at a relatively slow advancing speed. The further effect is that the distance between the step M8 of dropping A8 the first bale 12, and the finishing of the growing step M7 is limited. Because this distance is limited, the baler is stopped at M9, corresponding to step M3, close to where the first bale has been dropped onto the field.

Step M9 corresponds to step M3. At step M9 the advancing of the baler over the field 11 is stopped so that the baler stands still and no further crop material in the bale chamber 5. Step M10 is an step corresponding to the step M4. In step M10, the bale in the bale chamber can be wrapped for example with a net or plastic or twine so that the crop material forming the bale can be held together and so that the bale can largely keep its shape during further manipulation. At step M11, the second bale is transported from the bale chamber onto the bale holder, as is illustrated with arrow A5. Step M11 thereby corresponds to step M5. At step M11, the bale chamber door is opened, the bale is transported from the bale chamber to the bale holder, and the bale chamber is closed. Step M11 differs from step M5 by the bale holder 2 directly dropping the second bale 13 onto the field 11, as is illustrated with arrow A8. Since the baler stands still on the field close to where the first bale 12 has been dropped, directly dropping the second bale 13 from the bale holder has as a result that the first bale 12 and the second bale 13 are located on the field close to each other, as is illustrated in FIG. 2. After the bale chamber has been closed at the end of step M11, a new step M1 can be started, illustrated in FIG. 3 with M1' and M2'. This illustrates that the sequence of steps can be executed in a cyclic manner.

An important aspect of the invention is related to step M8. At step M8, the first bale 12 is dropped onto the field A8 a period of time before finishing growing the second bale 13 in step M7 and doesn't require a standstill of the baler. The main advantageous effect of dropping the first bale 12 before finishing growing the second bale 13 is that the efficiency of the operation of the baler is maximized, due to the absence of a standstill of baler, and reduces driver fatigue. As will be clear from FIG. 3 and the description of the steps M1-M11 above, the baler is only stopped when the bale in the bale chamber is finished growing, and the baler is started directly after the bale has been removed from the bale chamber to the bale holder and the bale chamber door is closed. No additional starting and stopping steps are used for loading and unloading bales from the bale holder 2. No additional waiting times are required for performing unloading or wrapping or other steps. Starting and stopping appear to be actions that most affect the operator. Therefore, minimizing starting stopping requirements improve the operator's condition, for example by reducing fatigue. Furthermore, the specific starting and stopping moment allow optimal usage of the baler 1. The baler is only stopped directly after a bale has finished growing in the bale chamber, and can be directly started after the bale has been removed from the bale chamber and the bale chamber door 8 has been closed while it is still possible to drop two bales in a controlled manner in each others vicinity. This optimizes the performance of the baler.

The baler preferably comprises a controller 10 for automatically executing the steps M1-M11, or at least largely automatically executing the steps M1-M11. Particularly, the controller automatically determines the period of time before finishing growing M7 the second bale 13, at which time the step M8 is executed. In this context, it is explicitly noted that the period of time before finishing the second bale 13 during step M7 is not intended to be a predetermined time-related period. This period of time can be determined based on multiple or individual combinations of factors, preferably based on the sensor 7 data or based on data coming from one or multiple sensors (not shown) in front of the tractor determining the volume and/or density of the crop in front of the baler. The knowledge of this data of crop on the field allows to predict how far the driver needs to drive forward before the second bale has been completely formed. This prediction can also be determined by monitoring the speed of bale forming diameter, for example via a monitoring by sensor 7. The skilled person will understand that the period of time between step M8 and the end of step M7 is related to the distance d3 that will be covered by the baler on the field 11 for finishing the second bale 13. Based on this relation, the skilled person can determine the period of time in such a manner that the first bale 12 and second bale 13 are positioned on the field, when at rest on the field, close to each other as illustrated in FIG. 2. This relieves the operator of the baler from extra starting and stopping steps for dropping bales while the bales are located on the field for efficient pickup as described above in relation to FIG. 2.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. A method for unloading a first bale and a second bale from a round baler onto a field, the round baler comprising a bale chamber and a bale holder, the bale holder being located outside of the bale chamber, the method comprising steps of:

growing the second bale in the bale chamber, while the first bale is carried by the bale holder;

unloading the first bale from the bale holder onto the field a period of time before finishing growing the second bale, the first bale defining a first position on the field when the first bale is at rest on the field;

finishing growing the second bale;

transporting the second bale from the bale chamber to the bale holder; and unloading the second bale from the bale holder onto the field, the second bale defining a second position on the field when the second bale is at rest on the field, wherein the period of time is determined such that a distance between the first position and the second position is smaller than a sum of a diameter of the first bale and a diameter of the second bale.

2. The method according to claim 1, further comprising, before the step of growing the second bale in the bale chamber, steps of:

growing the first bale in the bale chamber;
finishing growing the first bale; and
transporting the first bale from the bale chamber to the bale holder.

3. The method according to claim 2, further comprising steps of:

before the step of transporting the second bale from the bale chamber to the bale holder, wrapping the second bale in the bale chamber with a wrapping element; and before the step of transporting the first bale from the bale chamber to the bale holder, wrapping the first bale in the bale chamber with a wrapping element.

4. The method according to claim 2, wherein:

the steps of growing the first bale in the bale chamber and growing the second bale in the bale chamber each comprise introducing crop into the bale chamber while advancing the round baler over the field at a first speed; and the steps of finishing growing the first bale in the bale chamber and finishing growing the second bale in the bale chamber each comprise stopping the round baler from advancing over the field.

5. The method according to claim 4, further comprising a step of:

advancing the round baler over the field at a second speed at least said period of time before finishing growing the second bale, the second speed being lower than the first speed, such that the first bale is unloaded from the bale holder onto the field while the round baler advances over the field at the second speed.

6. The method according to claim 4, wherein the bale chamber comprises a bale chamber door towards the bale holder, the method further comprising steps of:

opening the bale chamber door after the round baler has stopped from advancing over the field, for transporting the first bale and the second bale, respectively, from the bale chamber to the bale holder; and closing the bale chamber door before advancing the round baler over the field.

7. The method according to claim 1, further comprising, while growing the second bale in the bale chamber, at least one of the steps of:

obtaining bale chamber sensor data representative for a status of the second bale being grown in the bale chamber;

obtaining baler movement data representative for a movement status of the round baler; and obtaining field swath information representative for an amount of swath collected by the baler, wherein said period of time is determined based on the obtained data.

8. The method according to claim 1, wherein the steps are performed iteratively, such that bales are unloaded onto the field forming pairs of bales on the field, the pairs of bales comprising the first bale and the second bale.

9. The method according to claim 1, wherein the period of time is determined such that the first bale and the second bale lie against each other when at rest on the field.

10. A round baler comprising a bale chamber, a bale holder located outside of the bale chamber, and a controller configured to control the round baler to perform steps of:

growing a second bale in the bale chamber, while a first bale is carried by the bale holder;

unloading the first bale from the bale holder onto a field a period of time before finishing growing the second bale, the first bale defining a first position on the field when the first bale is at rest on the field;

finishing growing the second bale;

transporting the second bale from the bale chamber to the bale holder; and unloading the second bale from the bale holder onto the field, the second bale defining a second position on the field when the second bale is at rest on the field, wherein the period of time is determined such that a distance between the first position and the second position is smaller than a sum of a diameter of the first bale and a diameter of the second bale.

11. The round baler according to claim 10, further comprising a wrapper in the bale chamber, wherein the controller is further configured to control the round baler to perform steps of:

before the step of growing the second bale in the bale chamber:

growing the first bale in the bale chamber;
finishing growing the first bale; and
transporting the first bale from the bale chamber to the bale holder;

before the step of transporting the second bale from the bale chamber to the bale holder, wrapping the second bale in the bale chamber with a wrapping element; and before the step of transporting the first bale from the bale chamber to the bale holder, wrapping the first bale in the bale chamber with a wrapping element.

12. The round baler according to claim 10, further comprising an operational connection to a towing vehicle, wherein the controller is further configured to send control signals via the operational connection to the towing vehicle.

13. The round baler according to claim 10, wherein the baler chamber comprises a bale chamber door towards the bale holder, wherein the controller is further configured to control the round baler to perform steps of:

before the step of growing the second bale in the bale chamber:

growing the first bale in the bale chamber;
finishing growing the first bale; and
transporting the first bale from the bale chamber to the bale holder, wherein the steps of growing the first bale in the bale chamber and growing the second bale in the bale chamber each comprise introducing crop into the bale chamber while advancing the round baler over the field at a first speed, wherein the steps of finishing growing the first bale in the bale chamber and finishing growing the second bale in the bale chamber each comprise stopping the round baler from advancing over the field, and wherein the controller is further configured to control the round baler to perform steps of:

opening the bale chamber door after the round baler has stopped from advancing over the field, for transporting the first bale and the second bale, respectively, from the bale chamber to the bale holder; and closing the bale chamber door before advancing the round baler over the field.

14. The round baler according to claim 10, further comprising at least one of a bale chamber sensor configured for obtaining bale chamber sensor data and a movement sensor for obtaining baler movement data, wherein the controller is further configured to control the round baler to perform, while growing the second bale in the bale chamber, at least one of the steps of:
- obtaining bale chamber sensor data representative for a status of the second bale being grown in the bale chamber;
- obtaining baler movement data representative for a movement status of the round baler; and
- obtaining field swath information representative for an amount of swath collected by the baler,
- wherein said period of time is determined based on the obtained data.

15. The round baler according to claim 14, wherein the bale chamber sensor data comprises at least one of a density, view, diameter, and weight of the second bale being formed in the bale chamber, and wherein the baler movement data comprises at least one of a speed and acceleration of the round baler with regard to the field.

* * * * *